United States Patent [19]
Engel et al.

[11] 3,768,377
[45] Oct. 30, 1973

[54] HYDROSTATIC BUTTON BEARINGS FOR PUMPS AND MOTORS

[75] Inventors: William K. Engel, Peoria; Peter H. Van Gaasbeek, Peoria; William B. Norick, Joliet; James L. St. Germain, Plainfield, all of Ill.

[73] Assignee: Caterpillar Tractor Co., Peoria, Ill.

[22] Filed: Jan. 14, 1972

[21] Appl. No.: 217,984

Related U.S. Application Data

[62] Division of Ser. No. 791,955, Jan. 17, 1969, Pat. No. 3,635,126.

[52] U.S. Cl. ............................. 91/486, 308/160
[51] Int. Cl. ...... F01b 3/02, F16c 17/06, F16c 17/08
[58] Field of Search.................. 91/485–487, 91/489, 491, 499; 92/57; 308/5 R, 9, 160

[56] References Cited
UNITED STATES PATENTS

| | | | |
|---|---|---|---|
| 2,449,297 | 9/1948 | Hoffer | 308/9 |
| 2,679,210 | 5/1954 | Müller | 91/488 |
| 2,695,199 | 11/1954 | Blizard | 308/9 |
| 3,120,816 | 2/1964 | Firth | 91/488 |
| 3,257,960 | 6/1966 | Keel | 91/486 |
| 3,353,877 | 11/1967 | Lindeboom | 308/9 |

Primary Examiner—William L. Freeh
Assistant Examiner—John T. Winburn
Attorney—Joseph L. Strabala

[57] ABSTRACT

In axial-piston, hydraulic pumps and motors, the thrust loadings of the pistons on their bearing supports vary proportionally to pressures in the unit and also circumferentially around the bearing supports. By employing hydrostatic button bearings pressurized in "sets" around the bearing support with at least one set pressurized with the unit's inlet pressure and another "set" pressurized by the unit's outlet pressure, improved bearing performance is achieved. Also, certain surface configuration forming the sills and recesses of the individual buttons can enhance bearing performance.

1 Claim, 9 Drawing Figures

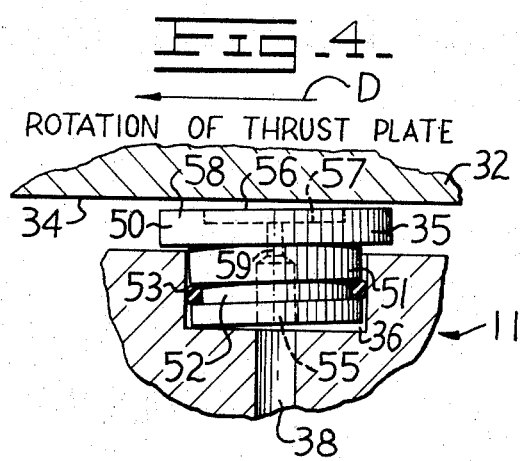
Fig. 4.
ROTATION OF THRUST PLATE
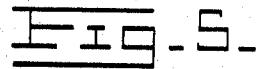
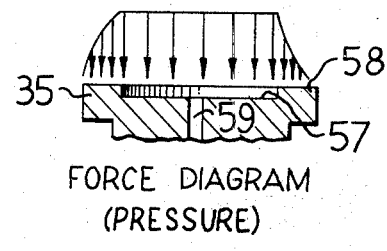
FORCE DIAGRAM
(PRESSURE)
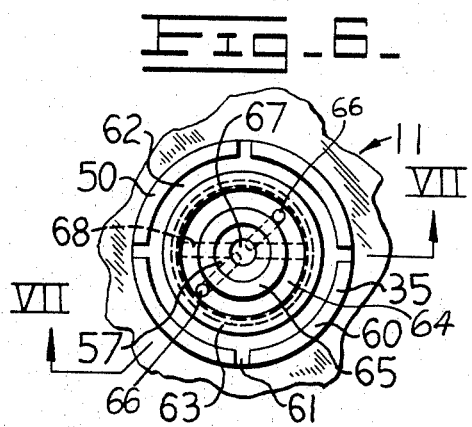
Fig. 6.
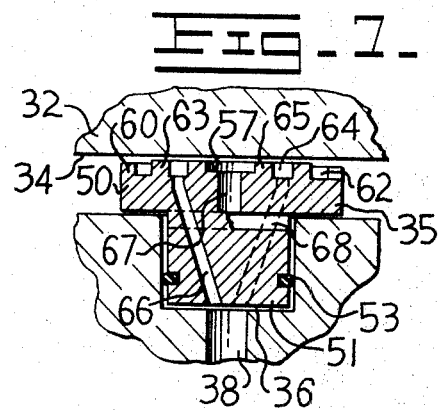
Fig. 7.
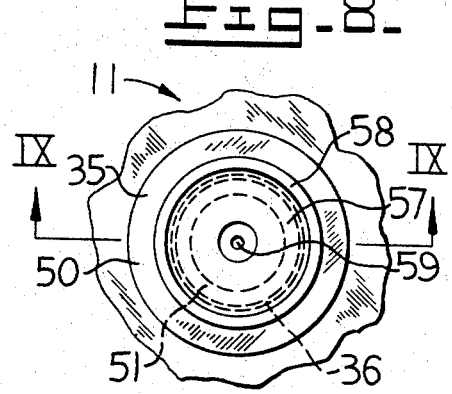
Fig. 8.
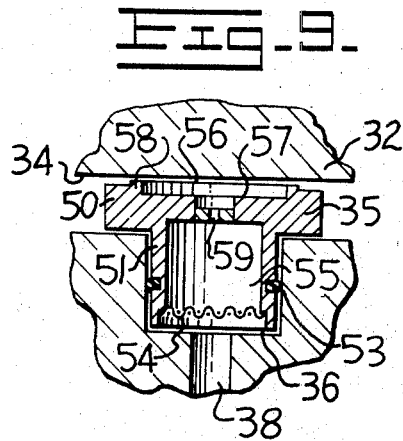
Fig. 9.

HYDROSTATIC BUTTON BEARINGS FOR PUMPS AND MOTORS this is a division of Ser. No. 791,955, filed Jan. 17, 1969 now U.S. Pat. No. 3,635,126.

BACKGROUND OF THE INVENTION

Currently, axial-piston hydraulic pumps and motors are often required to operate at pressures in the range of 5,000 PSI which can develop high oblique thrust forces on the bearings that vary as the components rotate. When the units are of the variable displacement type, the angle of the oblique thrust forces can vary appreciably.

Prior art units of the above type have employed hydrostatic buttons at the socket end of the piston or connecting rods and a passage through each rod and its associated piston whereby the associated button is pressurized at the cylinder pressure of its rod. Example of such prior art arrangements are illustrated in U. S. Pat. No. 2,241,701 issued to Doe and U. S. Pat. No. 3,121,816 issued to Firth. One of the difficulties with the prior art arrangements is that the pressures in the bearing pad vary sharply, sometimes exceeding the maximum pressure in the unit and at other times going below the minimum pressures required for proper bearing support, particularly on the intake stroke of the associated piston. This situation along with the stablizing problems of the individual buttons experienced at high rotational speeds have left room for measurable improvement.

Further, the manufacture of the hydrostatic button bearings and the required fluid supply system for axial piston type hydraulic units shown in the prior art arrangements are expensive and complex. In addition, individual replacement of the button bearing is often impractical, if not impossible. Thus, considerable difficulty is experienced with correcting clogging problems in the prior art arrangements and should one of the buttons fail to operate properly (clog), the thrust bearing for that piston rod is lost completely. This situation can quickly cause scoring of the associate runner surface on which the button bearings track and subsequently the failure of the complete thrust bearing system.

In addition, many of the prior art button bearing systems can not efficiently cooperate with mechanical bearings to jointly absorb the thrust forces, which vary with displacement angle, around the thrust plate or ring assembly since it is difficult to simultaneously maintain the proper clearances for the two bearing arrangements in such systems.

SUMMARY OF THE INVENTION

Most of the above difficulties can be eliminated and improved performance achieved by the hydrostatic thrust support system of this invention which is more economical than the prior art systems. Basically, it is employed in axial piston type hydraulic units having a plurality of connecting rods journaled in a common rotating thrust plate assembly and includes a plurality of pockets circumferentially disposed in the units structure adjacent to the thrust plate assembly, passage means connecting each pocket to a source of pressurized fluid, and a plurality of button bearing means received in each pocket, each button bearing means including a pad area cooperating with a surface on the thrust plate assembly, said pads including a recess having communication with its associated pocket and a circular sill surrounding said recess whereby pressure acting on each button bearing means will urge it toward said surface so the latter will be supported on a hydrostatic film. It is preferred that the buttons be pressurized in semicircular "sets," one "set" pressurized by passages connecting them to the unit's inlet, the other set pressurized by passages connecting them to the unit's outlet. This provides superior thrust compensation for the circumferentially varying thrust forces about the thrust plate assembly. Further, special pad area configuration will provide a tendency for the individual buttons to tip or tilt slightly due to the hydrodynamic film build up so that the maximum clearance exists at the leading edge of the button which is caused by the rotation of the cooperating surface on the thrust plate assembly. The above arrangement provides for simple and expedient button replacement not possible in prior art designs.

BRIEF DESCRIPTION OF THE DRAWINGS

The invention will be better understood by reference to the accompanying drawings wherein:

FIG. 4 is a section of a broken away portion of the trunnion structure illustrating one of the button bearings in section, and FIG. 5 illustrates the theoretical pressure profile across a button bearing face or pad;

FIGS. 6 through 9 illustrate, in plan and section respectively, two button bearing face or pad configurations.

DESCRIPTION OF A PREFERRED EMBODIMENT

Figure 1:
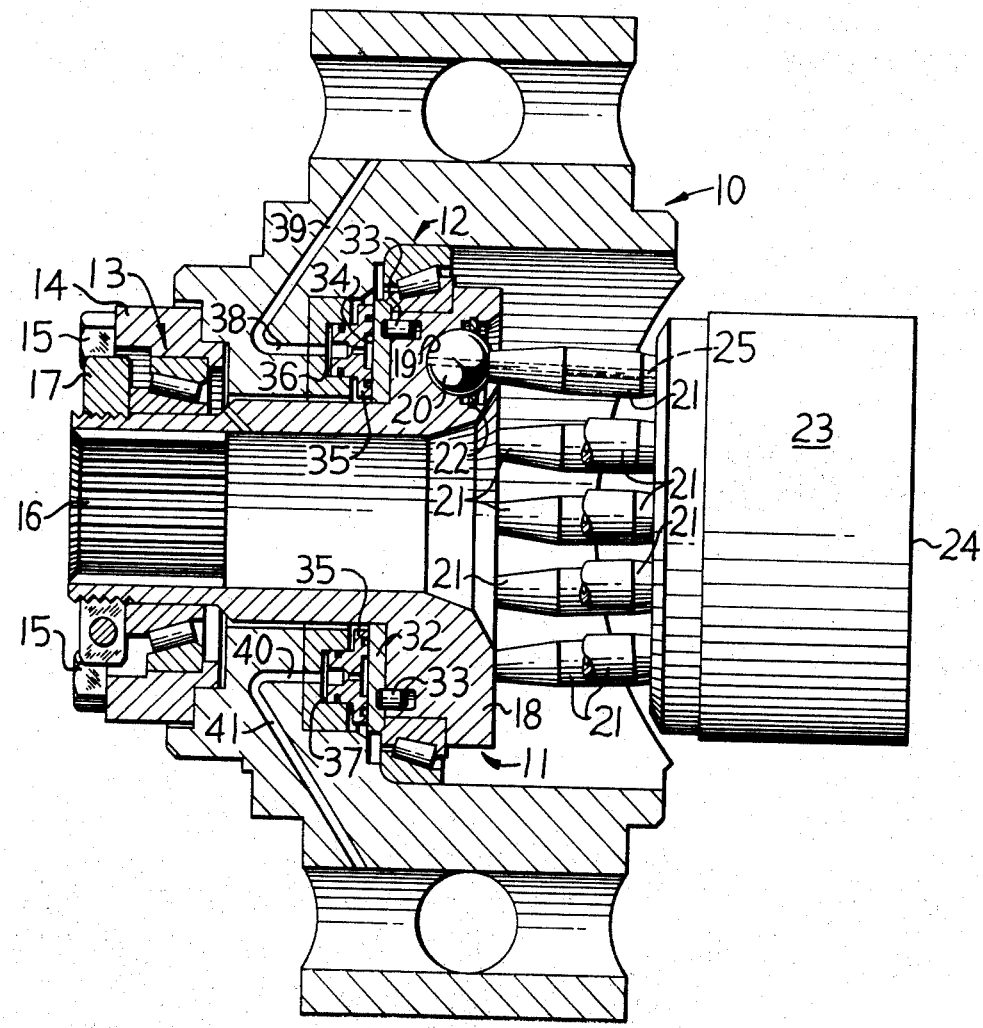
FIG. 1 is a section of a trunnion structure for an axial piston type hydraulic unit showing the novel hydrostatic button thrust bearing system incorporated therein.

The axial piston type hydraulic unit on which the invention is illustrated is fully described in U. S. Pat. No. 3,381,472 issued to Brown, et al, and reference is made to the Brown patent for full construction and operating details of such a unit. In FIG. 1, only the trunnion structure of the unit along with some of the associate components are illustrated since these components are principally related to the thrust problems involved. Of course, the current invention is not restricted to the illustrated axial piston type hydraulic unit and the invention can be employed on other similar type hydraulic units with many accompanying advantages. Further, it should be appreciated that these hydraulic units can function either as hydraulic pumps or as motors. Basically, the trunnion 10 forms the supporting structure for the thrust plate assembly 11 which is supported for rotation in the center of the trunnion on an inner roller bearing 12 and an outer roller bearing 13, the latter being retained by a bearing block 14 bolted to the trunnion with tap bolts 15. As shown in FIG. 1, tapered roller bearings can be employed and arranged to secure the thrust plate assembly. The hollow thrust assembly includes a female spline 16 for receiving a power shaft and a universal for driving the cylinder barrel (not shown). Also, a circular ring 17 abutting on roller bearing 13 and connected to the thrust plate assembly limits axial movement between the two roller bearings.

The inner portion of the thrust plate assembly 11 includes a radial flange 18, on the periphery of which, roller bearing 12 supports the assembly. In a plurality of sockets 19, circumferentially disposed around the inner face of the radial flange, the ball ends 20 of piston or connecting rods 21 are received and retained by snap rings 22. The connecting rods are attached to pistons (not shown) in the cylinder barrel 23 which has its ported face 24 supported on a valve plate (not shown). When the cylinder barrel has its port face angularly disposed to the radial flange 18, the connecting rods will reciprocate in the barrel with fluid pressures acting on their associated pistons. This situation will cause forces to be applied to the thrust plate assembly through the connecting rods and a passage 25 through each rod can supply lubrication to its socket 19 from the pressure side of its associated piston in a conventional manner.

Figure 3:
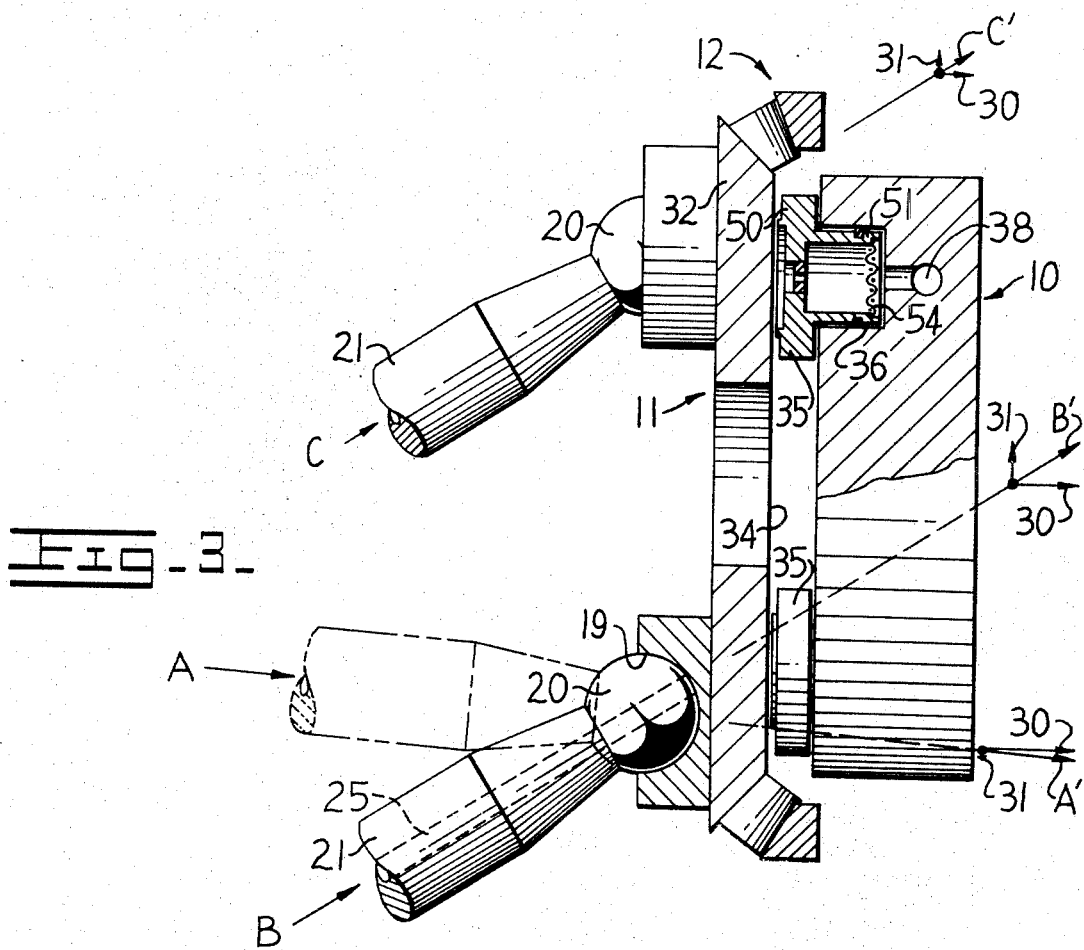
FIG. 3 schematically illustrates the oblique thrust forces acting on the hydrostatic button bearings and an associated mechanical bearing.

The angular position of the connecting rods 21 relative to the thrust plate assembly 11 during a positive displacement in the hydraulic unit is illustrated in FIG. 3, wherein vectors A', b' and C' indicate the thrust forces caused by pressures A, B and C acting through the associated connecting rods. As can be seen, the thrust forces vary circumferentially around the thrust plate assembly and each can be converted to an axial component 30 and a radial component 31. It is the variable axial components of these thrust forces that the instant invention is designed to provide better thrust compensation for than is available in prior art arrangements. The configuration has the following functions and advantages: The hydrostatic buttons support part of the piston thrust load, thus providing lower loads on the anti-friction bearing. This allows a smaller anti-friction bearing to be used and provides longer bearing life.

The amount of support provided by the hydrostatic buttons is constant for a given pressure, but the axial component of the piston thrust force varies with displacement angle. The anti-friction bearing supports the difference in the axial loads as well as the radial component of the piston thrust force.

Figure 2:
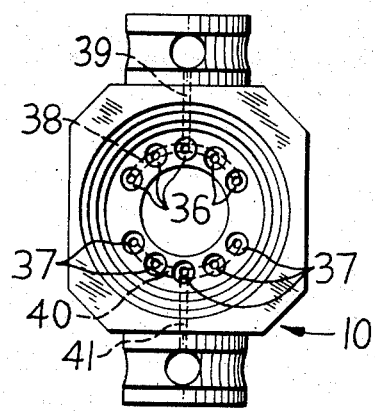
FIG. 2 is an elevation of the trunnion structure with the button bearings removed from their associated pockets in the trunnion and broken lines illustrating the fluid communication passageways connecting the several pockets.

To accomplish this objective the thrust ring 32 is mounted on a face of the radial flange 18 with dowels 33 so its thrust face 34 can form the runner part of a separate hydrostatic bearing formed with each of the buttons. The individual buttons 35 are circumferentially disposed in pockets 36 and 37 in the trunnion 10, as can be best seen in FIG. 2. Pockets 36, through passages 38 and 39, are in fluid communication with one side of the unit while pockets 37, through passages 40 and 41, are in fluid communication with the other side. Thus, pockets 36 form one semicircular "set" of buttons while pockets 37 form another semicircular "set" whereby one "set" will always be pressurized at the unit's inlet pressure and the other "set" always will be pressurized at the unit's outlet pressure.

Utilizing two semicircular "sets," pressurized at the inlet and outlet pressures respectively, avoids the individual pressure peaks occurring on the individual pistons and allows the rigidity of the thrust plate assembly to distribute the thrust loading more evenly on several of the individual button bearings composing the "set." Use of the buttons in high and low pressure sets allows the centroid of the hydrostatic button forces to be located close to the centroid of the axial piston thrust forces, thus minimizing moment unbalance on the thrust plate. With the buttons in sets and located as indicated, pressure in each set is continuous and does not fluctuate between inlet and discharge pressure as it would if the button rotated with the piston and rod and were lubricated by a passage through each piston rod. The passages are arranged so the higher pressure will be on the "set" with the highest loading, whether the high pressure is the unit's inlet or outlet. It is through such an arrangement that substantial advantages can be gained and button replacement greatly simplified.

The general configuration of each button 35 is best shown in FIGS. 4 to 9 wherein it can be seen that each button includes a head portion 50 and a cylindrical skirt 51 having a groove 52 for a seal 53 which prevents leakage of pressurized fluid around the skirt from pocket 36 (or 37) and passage 38 or 40. It can be seen that the individual button has considerable freedom of movement within its associated pocket.

The skirt 51 of each button is preferably hollow and may include a strainer or screen 54 over its mouth or opening 55 communicating with pressurized fluid in its associated pocket, which is best seen in FIGS. 3 and 9. The skirt fits loosely in its pocket so the button can tip or tilt about the center line of the pocket. This arrangement allows the individual button to track smoothly on the associated surface 34 and the bearing formed by the button to be less effected by distortion occurring in the thrust plate assembly due to high thrust loadings. The buttons having a degree of freedom to tilt and move axially can adjust for such things as non-parallelism between the thrust plate and trunnion, variation in assembled distance between thrust plate and trunnion, difference in running clearance required with changes in pressure, and/or temperature.

Basically each button 35 forms a separate hydrostatic bearing with the pad or face 56 of the button having a recess 57 in communication with the pressurized fluid in its pocket through an orifice or restrictor and a raised circular sill 58 which mates with the flat face or surface 34 of the thrust ring 32 which forms the runner of the bearing.

Since the thrust ring is rotating, there is some hydrodynamic bearing effect along with the hydrostatic bearing formed by the flow of pressurized fluid over the sill 58 of the pad or face 56 and acting in the recess. Movement of the thrust ring in the direction of arrow "D" tends to increase the flow of the fluid passing over the trailing edge of the sill and results in the slight tip of the button illustrated in FIG. 4. The effects of these actions are reflected in the force diagram illustrated in FIG. 5, wherein the pressure build up and drop off across the pad area is illustrated.

Because of these effects it is desirable to design the pad or face so this undesirable tipping or tilting of the pad or face area can be corrected.

More particularly FIGS. 8 and 9 illustrate the simplest button construction. Basically the construction includes the face or pad area 56 having a recess 57 and a raised circular sill 58, which are more clearly depicted in FIG. 9 which is a section along line IX—IX of FIG. 8. The head portion 50 of the button is larger than the skirt portion 51 which is received in pocket 36. Pressurized fluid is supplied through passage 38 (or 40), screen 54 to the mouth 55 of the button unit 35.

From inside the skirt the fluid passes through orifice 59 into recess 57. Thus, as pressure increases in passage 38, the pressure acting against the runner provided by surface 34 will increase, supporting the increased thrust loads acting on thrust ring 32 through the thrust plate assembly, etc.

Since the button is free to wobble and move axially in its pocket, the fluid pressure from passage 38 (or 40) acting on the bottom of the button will tend to urge the button toward the thrust face or surface 34 for optimum clearance between the sill and the thrust face or surface for the pressures involved and best hydrostatic film support. By utilizing this arrangement, the effects of both thermal and mechanical distortion are greatly reduced. Also, the hydrostatic button bearings can be "matched" with cooperating mechanical bearings for sharing the thrust loading so that problems of over and under compensation can be minimized. Having the sill raised centrally on the pad area also tends to increase the hydrodynamic build up of pressure on the leading edge of the button pad area, resulting in a favorable tilt of the button. Use of an overbalanced button (face force higher than hub force with recess at full pressure) with a restriction or flow control to reduce recess pressure provides a stable arrangement capable of compensating for changes in pressure profile over the face of the button with changes in speed and oil viscosity. If the button separates too far from the thrust plate, recess pressure drops and the button reseats. If the button tries to contact the thrust plate, recess pressure increases and separates the two surfaces.

FIGS. 6 and 7 illustrate another pad configuration for the button 35 with FIG. 7 being a section along lines VII—VII of FIG. 6. In this design multiple sills are employed to lessen the hydrodynamic effects referred to above. As can be seen in FIGS. 6 and 7, the face or pad includes an outer minor circular sill 60 which includes a plurality of notches 61 communicating with an inboard groove 62. This minor sill does not provide support but next is a concentric outer major sill 63 followed by a groove recess 64 and then a concentric inner sill 65 with an annular recess 57 located centrally in the pad face. Only the groove recess 64 is supplied with pressurized fluid through interior passages 66 and oil entering the central recess 57 can egress via passages 67 and 68 to drain. This arrangement tends to change the force diagram, distributing it away from the center area of the button and toward its outer diameter in a ring-like pattern. Since the narrower "force ring" will tend to have equal hydrodynamic pressure build up at diametric opposite sides, it will tend to stabilize the button and lessen its tilt or tipping.

Obviously in the above arrangements the bearings 12 and 13 assist the buttons in stabilizing the thrust plate assembly and provide additional support if the buttons fail to fully compensate or over compensate for the axial thrust loadings, especially at high swivel angles in the unit. Of course, these bearings absorb the radial component 31 of the oblique thrust forces without assistance from the button bearings.

What is claimed is:

1. A hydrostatic button with improved stability when employed as a bearing between relative sliding surfaces for use in a circular pocket recess in one of the sliding surfaces with the circular pocket recess having a source of pressurized fluid in communication therewith comprising:

a circular skirt base portion adapted to fit loosely in such pocket recess and having a central seal disposed circumferentially around said skirt base portion operable to prevent escape of pressurized fluid from said pocket recess when said skirt base portion is inserted therein while allowing said skirt base portion to oscillate therein with axial and tilting movements with reference to said circular pocket recess;

A hydrostatic bearing head portion affixed to one end of said skirt base portion, said head portion having a hydrostatic bearing outer surface oriented normal to the cylindrical axis of said skirt base portion;

at least three concentric sills on said bearing outer surface including a raised outer non-load bearing minor sill with bleed notches therein, a raised outer circular load bearing sill and an inner circular load bearing sill leaving a central recess within said inner circular load bearing sill, said central recess having a drain passage in said head portion communicating therewith allowing fluid to escape therefrom without passing over the top of said inner load bearing sill; and passage means in said head portion communicating with said outer surface within the confines of said outer and inner load bearing sills and a pocket recess within which said skirt base portion is inserted.

* * * * *